United States Patent [19]
Hase

[11] 3,824,449
[45] July 16, 1974

[54] FERRORESONANT VOLTAGE REGULATING CIRCUIT

[76] Inventor: Alfred Max Hase, 6 Manorwood Rd., Scarborough, Ontario, Canada

[22] Filed: May 29, 1973

[21] Appl. No.: 364,903

[52] U.S. Cl................... 323/6, 323/43.5 R, 323/57, 323/60, 323/45
[51] Int. Cl.............................................. G05f 1/32
[58] Field of Search .......... 323/6, 60, 61, 44 R, 57, 323/43.5 R, 45; 315/239, 242, 243, 276

[56] References Cited
UNITED STATES PATENTS

| | | | |
|---|---|---|---|
| 3,371,263 | 2/1968 | Walz et al. | 323/60 X |
| 3,435,330 | 3/1969 | Sola | 323/61 X |
| 3,579,088 | 5/1971 | Fletcher et al. | 323/60 X |
| 3,699,424 | 10/1972 | Hart et al. | 323/60 |
| 3,778,699 | 12/1973 | Hoffman | 323/60 |

*Primary Examiner*—Gerald Goldberg

[57] ABSTRACT

A ferroresonant voltage regulator circuit includes a saturable transformer, an unsaturable transformer in series with the input, and a capacitor across the saturable transformer. Voltage sensing and referencing circuitry is inserted in the output. A synchronous switch having a control wire — usually a saturable reactor, magnetic amplifier or triac — is connected across at least a portion of the saturable transformer, and is controlled by the control coil so that the saturable transformer has a load from the synchronous switch at no-load conditions of the regulator. The amount of loading on the saturable transformer from the synchronous switch varies substantially inversely as the amount of loading because of the regulator load.

8 Claims, 2 Drawing Figures

FERRORESONANT VOLTAGE REGULATING CIRCUIT

FIELD OF THE INVENTION

This invention relates to a voltage regulating circuit, particularly a ferroresonant AC voltage regulator. The invention provides an AC voltage regulator which can be built to have relatively high KVA ratings.

BACKGROUND OF THE INVENTION

Ferroresonant voltage regulators having saturable and unsaturable transformers are known, where the ferroresonant circuit comprises a saturable transformer — usually an autotransformer — an unsaturable transformer or an unsaturable reactor or linear reactor in series with the saturable transformer and the voltage source, and a capacitor across one of the windings of the saturable transformer so as to cause a ferroresonant circuit which is tuned to the line frequency or the fundamental frequency of the output voltage from the voltage regulator. It has been a major source of concern to reduce the size and weight of ferroresonant voltage regulators, and hence the cost thereof. Balian et al, U.S. Pat. No. 3,611,116 issued Oct. 5, 1971 teaches a circuit where one of the secondaries of an unsaturable transformer is connected in series-aiding with one of the windings of a saturable transformer or autotransformer, and is included directly in the ferroresonant circuit. The capacitor, in this case, is connected across the series connection of the secondary winding to form the ferroresonant circuit.

Other ferroresonant circuits, such as that taught in Gorbuntsov et al U.S. Pat. No. 3,662,254, issued May 9, 1972, include ferroresonant circuits where the saturable transformer winding is in series with a linear choke, but where the compensating winding is connected in series with an output circuit and capacitor. In the Gorbuntsov et al, circuit, an additional compensating winding is provided in series with the capacitor to compensate variations of voltage in the capacitor circuit, resulting in a stabilized AC output. However, the output of such circuit — while well stablized — may have very poor wave form — and in any event, such output would normally be intended to be rectified to a constant voltage DC.

Thus, there are certain dissadvantages which are generally found in ferroresonant circuits in AC voltage regulators; and they include the fact that the basic ferroresonant circuit yields a distorted output waveform which may be flat or dented at no load conditions, becoming sinusoidal at full load conditions. Other dissadvantages of ferroresonant circuits that have been used in the past are the fact that frequency variation and voltage changes which are caused by changes of the load and changes in ambient temperature, cannot be compensated for and may be reflected in the output voltage. Also, because ferroresonant circuits operate in the high magnetizing region of the transformer core, such circuits are normally limited to relatively low KVA power ratings because of the extra heat losses which are generated in the saturable transformer and other circuit components.

On the other hand, there are certain inherent advantages in the use of ferroresonant circuits in AC voltage regulators, and they include the fact that a basic ferroresonant circuit can maintain good voltage regulation — at least within name plate ratings — for line voltage variations of plus or minus 15 percent. Ferroresonant circuits generally have a fast response time, in the order of less than one period of the line frequency; and they normally have very low overshoot or undershoot. Because of their nature, ferroresonant circuits have inherent current limiting and a short circuit-proof overload characteristic, and they have high efficiency and inherent reliability.

As noted, however, constant voltage regulation in a basic ferroresonant circuit is achieved because the saturable transformer is designed and driven to operate in the high, saturating part of its hysteresis curve; and of course, the saturable transformer has a grain oriented steel core and may be generally referred to as a transformer having an iron core. Because the saturable transformer is designed to operate in the high saturating part of its hysteresis curve, the transformer is generally limited to low KVA power ratings because of extra heat losses which may occur.

The present invention maintains the advantages of prior, basic ferroresonant circuits and overcomes the disadvantages thereof by providing a ferroresonant voltage regulating circuit having a basic tuned ferroresonant circuit but having a synchronous switch [generally an ampere turns transductor such as a saturable reactor or a magnetic amplfier, having a control coil; or alternatively, suitable filtered SCR circuitry using a pair of back-to-back SCR's with control circuitry], where the synchronous switch is connected across at least a portion of a winding of the saturable transformer and where the control coil of the synchronous switch is connected in series with a three-wire semiconductor device [such as a transistor or SCR] which is connected together with suitable voltage sensing and reference circuits in the output of the voltage regulator so as to drive the synchronous switch to conductive state at no load conditions of the voltage regulator, thereby preloading the saturable transformer and the basic ferroresonant circuit.

By preloading the basic ferroresonant circuit, whose output voltage waveform is sinusoidal, it is possible to establish and maintain close tolerances of RMS and peak regulation, and thereby to provide substantially pure sinusoidal output waveform at full load of the voltage regulator circuit, with low distortion and low harmonic content in the output voltage waveform.

By providing control of the synchronous switch which is across the saturable transformer — the constant voltage transformer as it will be referred to hereafter — the constant voltage transformer is made always to act in the linear portion of its hysteresis curve; and therefore the AC voltage regulator of the present invention is particularly well suited for use as an AC-filter and waveform regulator for inverter applications. The AC voltage regulator of the present invention is also particularly suited for use where the output voltage and waveform must be maintained constant over a wide range of input, such as determined by a battery or bank of batteries which may be anywhere from fully discharged to floating at line equalization, through suitable rectifiers.

The output sensing of a voltage regulator in accordance with this invention can be made to be average sensing rather than peak or RMS sensing, so that control of the synchronous switch by its control coil can be average-regulated rather than peak or RMS-regulated.

Thus, better waveform and better voltage reulation — as well as better system stability — can be achieved. Also, the voltage regulator is less sensitive to commutating-type, or changing power factor-type loads; because the voltage referencing and synchronous switch control can be made with the reasonable presupposition that — because of the nature of the present invention — the waveform of the output voltage of the voltage regulator is sinusoidal.

BRIEF SUMMARY OF THE INVENTION

It is a purpose of this invention to provide a ferroresonant voltage regulator having a basic ferroresonant circuit which is preloaded by a synchronous switch which is driven by reference to the output voltage of the voltage regulator.

An object of this invention is to provide a ferroresonant voltage regulator which can be operated at relatively high KVA power ratings.

A feature of this invention is that the basic ferroresonant and the feedback voltage regulating circuit taught hereby can be relatively inexpensively produced using essentially "off-the-shelf" circuit elements.

DESCRIPTION OF THE DRAWINGS

These and other purposes, objects and features of the invention are more fully discussed hereafter in association with the accompanying drawings, in which.

DESCRIPTION OF THE PREFERRED EMBODIMENTS

Figure 1:
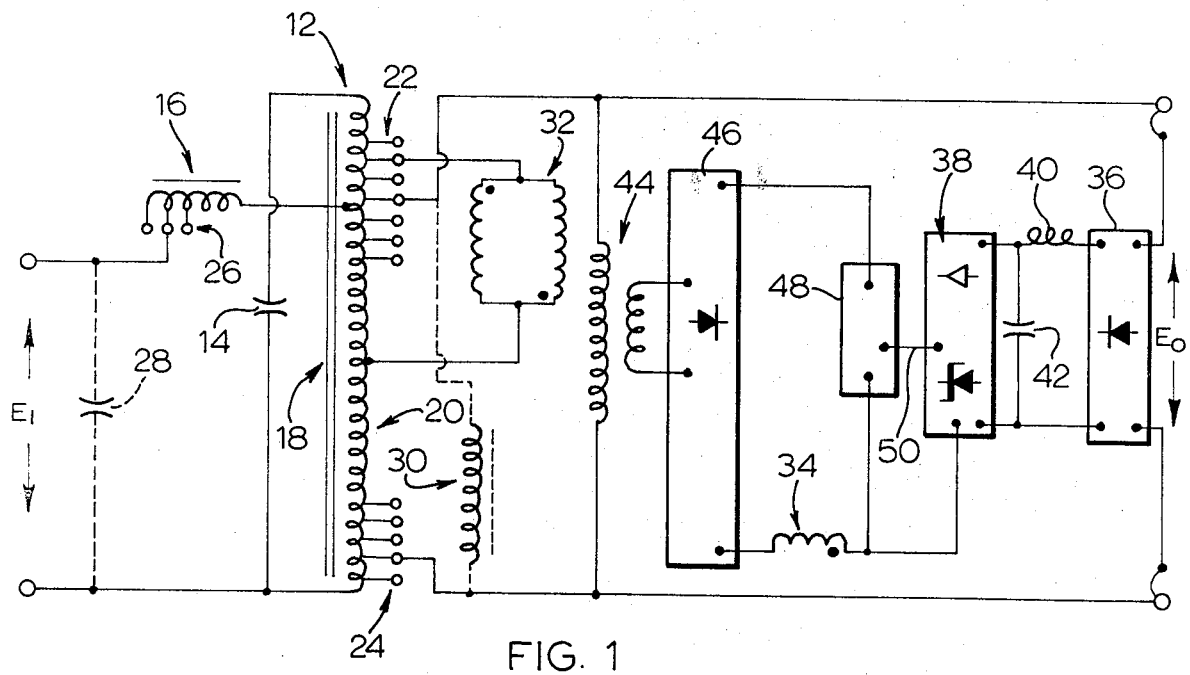
FIG. 1 is a basic circuit showing a ferroresonant voltage regulator in accordance with this invention.

The present invention provides a ferroresonant voltage regulating circuit having an AC input voltage $E_I$ and a regulated AC output voltage $E_O$. The ferroresonant voltage regulating circuit of the present invention includes a basic, tuned ferro-resonant circuit which is tuned for optimum voltage regulating performance at the fundamental frequency of the output voltage $E_O$. The basic ferro-resonant circuit comprises a constant voltage transformer indicated generally at 12, and having an iron core; a capacitor 14 which is connected across the constant voltage transformer; and a linear reactor 16 which has an air gap and which is connected in series with the input voltage $E_I$. The constant voltage transformer — which is, as noted above, a saturable transformer — has an input side indicated generally at 18 and an output side indicated generally at 20. The constant voltage transformer 12 may be an autotransformer, or it may be an isolating transformer. In any event, the capacitor 14 is connected across the constant voltage transformer 12 so as to be across either the input side 18 of the transformer or the ouput side 20 of the transformer. When the constant voltage transformer 12 is an autotransformer the linear reactor 16 is connected to a suitable input tap as required and as determined by the line voltage conditions. The capacitor 14 is connected across the autotransformer — and normally the capacitor 14 is connected to a higher tap than any other input tap which is used. The output tap on the autotransformer is chosen for the required value of $E_O$.

If the constant voltage transformer 12 is an isolating transformer, the input voltage $E_I$ is across the primary of the isolating transformer, and the output voltage $E_O$ is taken from across the secondary of the transformer. The linear reactor 16 may be connected in series with the input voltage $E_I$ to either the primary or the secondary winding of an isolation transformer which is used as the constant voltage transformer 12; and the capacitor 14 may be connected across either the primary or secondary winding. In any event, the connection of the capacitor 14 and linear reactor 16 is made with the iron core isolating transformer so as to form a basic ferroresonant circuit, tuned to the fundamental frequency of the output voltage $E_O$.

It should be noted that the constant voltage transformer 12 is shown having a number of coarse taps indicated at 22, and a number of fine taps indicated at 24. The coarse and fine taps may be on the primary or secondary windings, or both, of an isolating transformer; or they may be as shown for an autotransformer. In addition, the linear reactor 16 may be tapped, as shown at 26. The linear reactor 16 has an air gap, which allows for current limiting of the regulated output power. An additional capacitor 28 may be connected in the input to the voltage regulator according to this invention for power factor correction, if necessary; and an additional linear reactor 30 may be placed in the output of the ferroresonant circuit, as shown. It should also be noted that, as is well known to persons skilled in the art, the constant voltage transformer 12 includes an overwind coil which allows optimum tuning of the basic ferroresonant circuit. The overwind coil is wound on the same coil of the constant voltage transformer that the capacitor 14 is connected across.

A major feature of the present invention is the fact that a synchronous switch is connected across at least a portion of a winding of the constant voltage transformer 12. The synchronous switch is shown generally at 32, and may be an ampere turns device such as a saturable core reactor or a magnetic amplifier; or it may be equivalent, suitably filtered, back-to-back silicon rectifiers or triacs. In any event, the synchronous switch has a control coil 34 which is arranged so as to make the synchronous switch conductive when the control coil is conductive. The circuit conditions relating to the control coil are discussed hereafter.

It has been noted that the synchronous switch is connected across at least a portion of a winding of the constant voltage transformer 12. When the constant voltage transformer is an autotransformer, the connection of the synchronous switch may be as shown in the figures; and when the saturable transformer is an isolating transformer, the synchronous switch may be connected across at least a portion of either the primary or secondary winding. The purpose of the synchronous switch 32 is to keep a load on the core of the constant voltage transformer, under the control of the conditions of the output voltage $E_O$ under any load condition, so that the constant voltage transformer acts in the linear portion of the hysteresis curve of its core. Thus, minimum waveform distortion of the voltage waveform at the output terminals of the regulating circuit according to this invention may be achieved. The synchronous switch 32 acts as a preload on the core of the saturable or constant voltage transformer 12.

By having the preload synchronous switch or reactor across either a portion or the entire winding of the saturable, constant voltage transformer which forms a portion of the tuned ferroresonant circuit, the inherent fast response time of a basic ferroresonant circuit is preserved at all load conditions of the voltage regulator according to this invention. This is because the preload reactor is always biassed with a constant voltage — because of the constant voltage operation of the tuned basic ferroresonant circuit — so that only the current must change in the preload reactor or synchronous switch as load conditions on the voltage regulator change. Because only the current must change under the constant voltage bias, fast response — within one cycle of the output frequency — is assured.

The remainder of the voltage regulator circuit according to this invention comprises voltage sensing means across the output of the voltage regulating circuit, and a DC bridge, suitable amplifiers if required and reference circuit means connected to the voltage sensing means in driving relationship with a three-wire semiconductor device so as to render the three-wire semiconductor device conductive at no load conditions of the voltage regulating circuit according to this invention. As well, the circuit comprises a DC voltage supply for the three-wire semiconductor device. Referring to the circuit of FIG. 1, a rectifier 36 is shown connected across the output of the voltage regulating circuit. Suitable amplifer, sensing and reference circuit means of the sort known to the skilled practioner may be included in a circuit element marked generally at 38, which is fed from the rectifier 36. A choke 40 and a capacitor 42 may be inserted between the DC bridge 36 and the circuits 38, for purposes discussed hereafter.

An auxiliary DC power supply is also provided, such as by transformer 44 and rectifier bridge 46; and a three-wire semiconductor device 48 is connected to the DC voltage supply so as to be properly biassed thereby. The three-wire semiconductor device 48 may be a transistor, in which case the connection 50 from it to circuits 38 is from the base of the transistor; or the three-wire semiconductor device may be an SCR, in which case the connection 50 to circuits 38 is from the gate of the SCR. The remaining connection of the three-wire semiconductor device to circuits 38 is through suitable isolation or equalization circuits, as well known to the skilled practitioner.

In any event, it will be noted that the three-wire semiconductor device 48 is connected with respect to the control coil 34 of the synchronous switch 32 so that the control coil 34 is in series with the three-wire semiconductor device 48. The sensing and voltage referencing circuitry 38 is arranged so that the three-wire semiconductor device 48 is conductive at no load conditions of the voltage regulator circuit according to this invention; and thus at no load conditions, the control coil 34 of the synchronous switch 32 is also conductive. Therefore, at no load conditions the synchronous switch 32 is conductive and a preload condition exists with respect to the tuned ferroresonant circuit including the constant voltage transformer 12 and the linear reactor 16. The constant voltage transformer 12 is thus forced to operate in the linear portion of the hysteresis curve of its core; and as the load conditions on the voltage regulator circuit according to this invention increase, the operation of the synchronous switch 32 changes in view of its reaction to its control coil 34, which in turn is driven from the three-wire semi-conductor device 48, thus tending to unload the basic ferroresonant circuit. Fast response time to changing load conditions can be achieved; and sinusoidal waveform of the output voltage can be maintained over the complete operating load range.

When the circuits 38 are connected through the choke 40 and capacitor 42 to the rectifier 36, voltage sensing of output voltage $E_o$ becomes average sensing. In that case, control of the synchronous switch 32 by its control coil 34 can be average-regulated rather than peak or RMS-regulated. Thus, better waveform and better voltage regulation can be achieved, together with better system stability, than from a basic ferroresonant circuit. The voltage regulator including the average sensing is less sensitive to commutating-type loads, or loads having changing power factors. As noted above, the preload on the basic ferro-resonant circuit by the addition of the synchronous switch 32 is such as to permit the presupposition that the waveform of output voltage $E_o$ will be sinusoidal at all load conditions.

It should be noted that a closed loop feedback circuit is achieved; and that precision regulation of the output voltage $E_o$ by operation of the synchronous switch 32 when controlled by its control coil 34 which is within the closed loop feedback circuit, is possible. Also, it should be noted that remote sensing of the output voltage $E_o$ can be accommodated, so that precision regulation of output voltage at terminals which are physically removed from the ferroresonant circuits is possible.

Because the present invention utilizes feedback loop voltage control, the output voltage $E_o$ is maintained constant irrespective of frequency changes of the input voltage $E_i$.

It has been noted that when the synchronous switch 32 is made to respond to average load-voltage demand of the load, the ferroresonant tuned circuit is loaded uniformally and can therefore maintain a constant output voltage $E_o$ with substantially uniform peak/RMS or RMS/average relationships. In other words, there will be a very low harmonic content in the output voltage $E_o$.

It is an inherent characteristic of ferroresonant tuned circuits of the sort taught herein that the output voltage waveform of the constant voltage transformer is substantially sinusoidal. When the ferroresonant tuned circuit is loaded uniformly in accordance with this invention, almost any waveform of input voltage — from square wave to sinusoidal — can be accommodated, with substantially sinusoidal output voltage waveform at least in the range of power output according to the nameplate.

Figure 2:
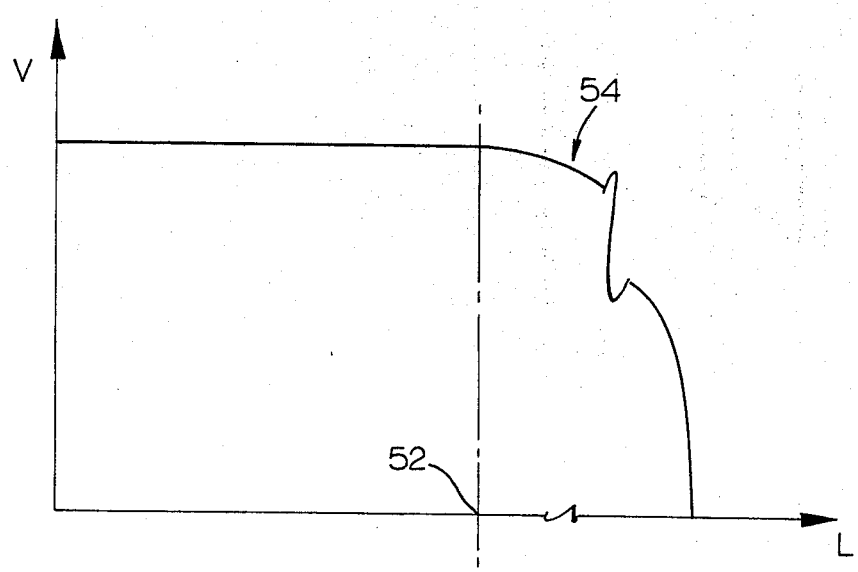
FIG. 2 is a curve showing typical voltage vs. load characteristics of a ferroresonant voltage regulator according to this invention.

Reference to FIG. 2 shows a typical curve of voltage vs. load of a voltage regulator according to this invention. Within name plate ratings of the regulator, to a limit marked at 52, the output voltage of the regulator is substantially constant. At some load higher than name plate ratings of the voltage regulator, the voltage begins to droop as at 54 because of the current limiting action of the linear reactor 16, which has an air gap; and ultimately the voltage droops to zero. Thus, there is an inherent short circuit proof operation of the circuit of FIG. 1. Under current-limiting and short circuit conditions, the input current to the basic ferroresonant circuit is effected by the linear reactor 16, and is highly inductive. Using power factor correcting means, such as capacitor 28 [or when the circuit is applied as an output regulator for inverters, and includes feedback diodes] the resultant input current can be reduced to less than 20 percent of the nominal full-load input current. In these conditions, the output voltage $E_o$ has collapsed substantially to zero.

In the event that the three-wire semiconductor device 48 should fail — whether it be a transistor or an SCR — the control coil 34 would be biassed to its maximum conductivity because failure of a three-wire semiconductor device is by shorting, not by having the device become an open circuit. Thus, the circuit is "fail safe" and goes to low output in the event of the failure of the three-wire semiconductor device, because the synchronous switch 32 is driven to maximum load on the basic ferroresonant circuit.

The three-wire semiconductor device 48 may also be connected in parallel with the control coil 34, in much the same manner as the shunt control circuits for magnetic amplifier control that are taught in Hase Canadian Pat. No. 882,798, issued Sept. 9, 1969. However, in this instance, the shunted control coil would be in the closed loop feedback circuit.

If the taps on the linear reactor 16 are changed so as to increase the voltage across it, there may be a lower current limiting characteristic and more short circuit proof performance.

It should also be noted that because the basic ferroresonant circuit is preloaded by operation of the synchronous switch 32, the magnetizing current is reduced, and so too are the heat losses resulting from the magnetizing current. Therefore, higher KVA power ratings may be obtained, using convection cooled devices. Also, as noted above, the circuit can be designed in a given KVA power rating and voltage range so that the components used are essentially "off-the-shelf" components. The cost of assembly of a voltage regulator according to this invention may therefore be significantly reduced.

It has been noted that additional components may be added to the circuits — such as power factor correcting capacitor 28 and additional linear reactor 30. Also, the constant voltage transformer 12 may be an autotransformer, or it may be an isolating transformer. The synchronous switch 32 is normally a saturable reactor or other ampere turns device such as a magnetic amplifier, having a control coil; but it may be substituted by a suitably filtered pair of SCR's in back-to-back relationship. Finally, the three-wire semiconductor device may be a transistor or an SCR; but in any event, it is connected in series with the control coil 34 in a closed loop feedback system — a DC system — having suitable voltage sensing and referencing means so as to drive the three-wire semiconductor device 48, and thus the control coil 34, conductive at no load. It has been noted that by the addition of choke 40 and capacitor 42 in the sensing circuits, the basic ferroresonant circuit — and thus the constant voltage transformer 12 — may be made to be average-responsive and not peak-responsive. Three circuits such as illustrated in FIG. 1, and as discussed above, may be concurrently used as a three-phase, wye-connected power regulator for three-wire or four-wire output. An AC regulator according to this invention may be used as a voltage regulator for DC power supplies, by suitable remote sensing of the DC output of the DC power supply; and by using suitable filters and voltage referencing circuitry, but with an AC input to the ferroresonant circuit. In that instance, the regulator would be functioning essentially as a battery eliminator having the extremely fast response time of the uniformly loaded AC ferroresonant tuned circuit.

Other modifications and substitutions in the circuitry of a ferroresonant voltage regulating circuit in accordance with this invention may be made, without departing from the spirit and scope of the following claims.

What I claim is:

1. A ferroresonant voltage regulating circuit having an AC input voltage and a regulated AC output voltage comprising:
a constant voltage transformer having an input side and an output side, and having an iron core and an overwind coil;
a first capacitor connected across said constant voltage transformer so as to be across the input side of said transformer, said overwind coil being on the side of the constant voltage transformer across which said capacitor is connected;
a linear reactor having an air gap, and connected in series with said AC input voltage; said iron core transformer, capacitor and linear reactor comprising a tuned ferroresonant circuit;
synchronous switch means connected across at least a portion of one winding of said constant voltage transformer; said synchronous switch having a control means which acts to make said synchronous switch conductive when said control means is conductive;
voltage sensing means across the output of said voltage regulating circuit, rectifier means and reference circuit means connected therewith through driving circuit means to a three-wire semiconductor device so as to render said three-wire semiconductor device conductive at no load conditions of said voltage regulating circuit; and auxiliary DC power supply means for said three-wire semiconductor device and said driving circuit means;
wherein said control means of said synchronous switch is in series with said three-wire semiconductor device.

2. The ferroresonant voltage regulating circuit of claim 1, wherein said synchronous switch means is a saturable reactor.

3. The ferroresonant voltage regulating circuit of claim 1, where said three-wire semiconductor device is a transistor.

4. The ferroresonant voltage regulating circuit of claim 1, where said three-wire semiconductor device is a silicon controlled rectifier.

5. The ferroresonant voltage regulating circuit of claim 1, where said constant voltage transformer is an autotransformer.

6. The ferroresonant voltage regulating circuit of claim 1, where said constant voltage transformer is an isolating transformer having a primary winding and a secondary winding.

7. The ferroresonant voltage regulating circuit of claim 1, including a choke in series with said rectifier means and said reference circuit means, and a second capacitor across said reference circuit means.

8. The ferroresonant voltage regulating circuit of claim 7 further including another capacitor across the input of said circuit, and a second linear reactor having an air gap across the output of said circuit.

* * * * *